Oct. 8, 1957  N. A. TORNBLOM  2,808,631
SUPPORT CLAMP FOR CABLES
Filed Jan. 27, 1954  2 Sheets-Sheet 1
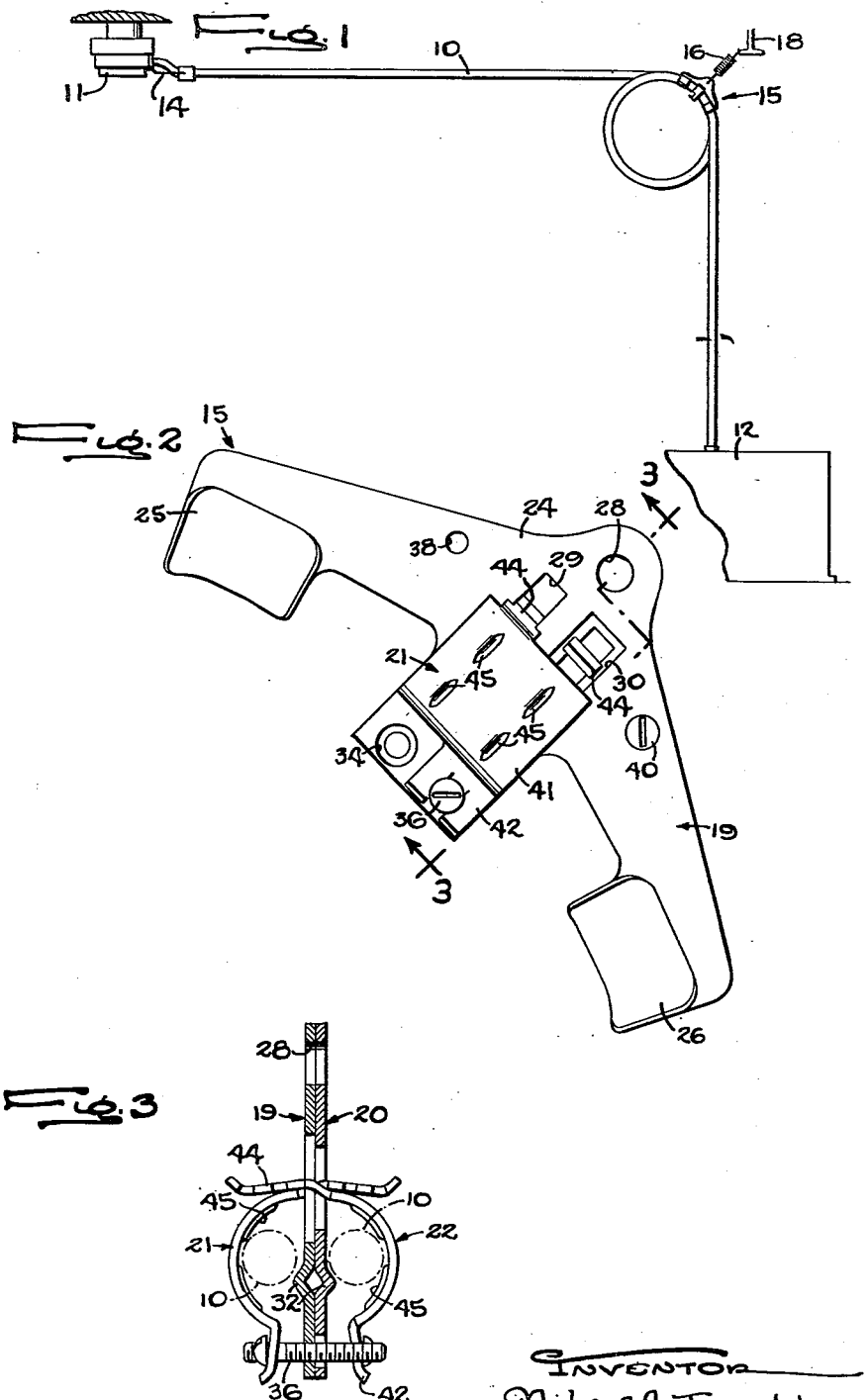

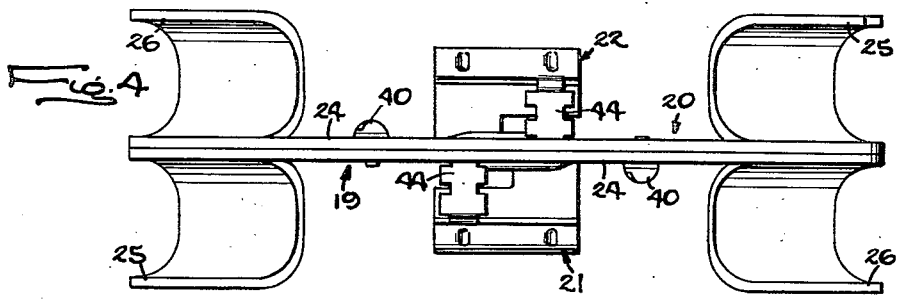
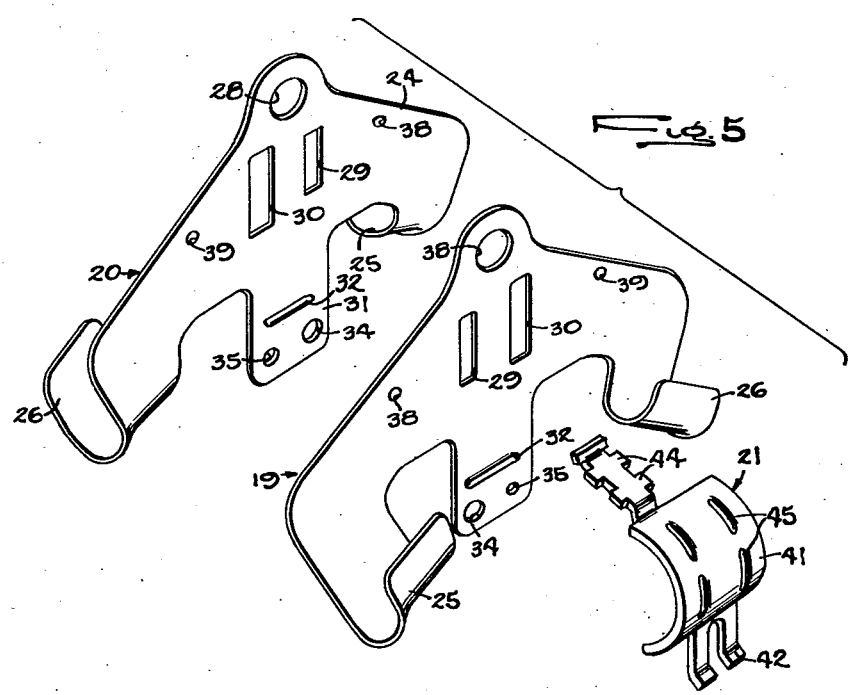
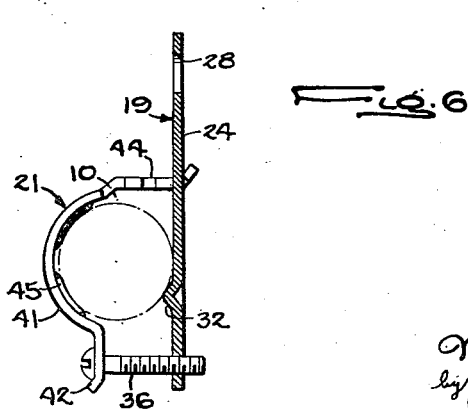

United States Patent Office 2,808,631
Patented Oct. 8, 1957

2,808,631

SUPPORT CLAMP FOR CABLES

Nils A. Tornblom, Chicago, Ill., assignor to Appleton Electric Company, Chicago, Ill., a corporation of Illinois Application January 27, 1954, Serial No. 406,464

3 Claims. (Cl. 24—81)

The present invention relates to support clamps for holding electric cables or cords extended between electrical sources or buses and remote electrical apparatus. More specifically, the invention relates to cable supporting clamps of unique construction which are adapted to sustain a length of power cable with or without a substantial loop to provide slack for adjustment of the cable.

To illustrate one environment in which the present invention finds especially advantageous use, it might be noted that, in manufacturing plants or repair shops employing electrically-operated machinery, it is a common practice to provide an overhead electrical bus system, and to establish flexibile and extensible power supply connections from such bus system to each machine. This is accomplished by an electric cable running horizontally from a bus duct to a point above a machine and thence vertically downward for connection to the machine. The cable is thus held in the shape of an inverted L and out of the way of working operations. To support the cable at its bend, i. e., at the region between the arms of the L, an anchoring clamp is employed, preferably curved to prevent kinking or breaking of the cable.

The general aim of the present invention is to provide an improved support clamp for cables in an environment such as that described above.

More specifically, it is an object of the invention to provide a dual support clamp of the above described type for supporting two portions of a cable in an adjustment loop.

Another object is to provide such a dual clamp formed of identical halves easily secured together, but also easily separated and used as single support clamps.

Another object of the invention is to provide such a support clamp which is adjustable to hold cables of a wide range of sizes.

Still another object is to provide such a support clamp which is easily and economically manufactured, and highly convenient in use.

Further objects and advantages will become apparent as the following description proceeds, taken in conjunction with the accompanying drawings, in which:

Figure 1 is an elevational view of an illustrative cable installation employing a support clamp exemplifying the present invention;

Fig. 2 is an enlarged elevation of the support clamp shown in Fig. 1;

Fig. 3 is a sectional view taken substantially along the line 3—3 in Fig. 2 and additionally showing two cables or two portions of the same cable in clamped positions;

Fig. 4 is a plan view of the support clamp shown in Fig. 2;

Fig. 5 is an exploded perspective view of the support clamp; and

Fig. 6 is a sectional view similar to Fig. 3 but illustrating one-half of the clamp as employed in holding one cable or cable portion.

Although the invention has been shown and described in some detail with reference to a particular embodiment, there is no intention to thereby limit the invention to such detail. On the contrary, the invention is to cover all alterations, modifications, and equivalents falling within the spirit and scope of the invention as defined by the appended claims.

Referring now to Fig. 1, an electric cable 10 is shown extending between an overhead supply bus 11 and a remote electrical machine 12. The cable is secured to the bus by an anchoring link 14 and extends horizontally to a support clamp 15 embodying the present invention which is anchored, preferably by means of a resilient element or spring 16, to an overhead beam 18 located substantially directly above the machine 12. In this instance, the cable 10 is of greater length than actually necessary and is provided with an adjustment loop having two portions held by the supporting clamp 15. By this arrangement, it is possible to move the machine around to various locations without resplicing or reconnecting the cable, the amount of slack in the loop being increased or reduced as necessary. Such mobility of the electrical machine 12 without the necessity of cutting or splicing the cable 10 is highly advantageous in certain installations where changes of machinery locations are made frequently and must be completed quickly.

With further reference to Figs. 2 through 6, the dual support clamp 15 here shown comprises two identical body members 19 and 20, preferably formed of sheet metal and secured together in back-to-back relation. In accordance with the practice of the invention, each of the body members provides troughs longitudinally spaced generally along an arc for receiving and supporting the cable 10 in a smooth bend, thus preventing kinking or breaking. Additionally, adjustable clamp elements 21 and 22 cooperate with the body members 19 and 20 to positively lock the cable in place between the troughs.

The body members 19 and 20 may be formed to be identical. A description of one will suffice for both. As best seen in Fig. 5, each body member includes a flat central portion 24 together with opposite end portions having ears 25, 26 bent outwardly to define the troughs. The troughs are preferably made concave along their transverse dimension to receive various sizes of cable and are spaced generally along an arc to support the cable 10 with a smooth bend as most clearly shown in Fig. 1. The body members 19 and 20 preferably are relatively thin and flat and may thus be formed of heavy gauge sheet metal by a convenient stamping and forming operation. The center portion 24 has a top aperture 28 for receiving an anchoring fastener, such as a hook or loop of the spring 16 in Fig. 1. Beneath the top aperture 28, two spaced openings are provided, the first being relatively small and narrow in the form of a key slot 29, and the second being relatively larger, here shown as a rectangular hole 30. The spacing of the key slot 29 and hole 30 is such that they will register respectively with the hole 30 and key slot 29 of the second body member when placed in back-to-back relation thereto, as more fully explained below. The central portion 24 also includes a depending tail section 31 extending below the general arc on which the longitudinal axes of the troughs lie, this tail being provided with a boss 32 which aids in clamping of the cable, and beneath such boss with two spaced circular holes 34 and 35. The first of these holes 34 is relatively larger and located substantially beneath the key slot 29, while the second of the holes 35 is relatively smaller and located substantially beneath the larger rectangular hole 30. The second hole 35 is tapped for receiving a clamping screw 36.

For securing the body members together, each includes a pair of fastening holes 38 and 39 defined in the central portion 24. The first of these holes 38 is tapped to receive a fastening screw 40 while the second of the holes 39 is slightly larger and untapped to permit passage of such screw therethrough. The locations of these fastening holes 38 and 39 are also such that the tapped hole 38 on the first body member 19 registers with the second untapped hole 39 on the second body member when the two body members are placed in back-to-back relation.

The clamp elements 21 and 22 also may be identical. Each includes a generally curved or arcuate body portion 41 for fitting around a circular cable, with a slotted ear 42 on one corner for receiving the screw 36 and a multiple keyed projection 44 on the diagonally opposite corner. The inner face of the body may have axially extending bosses 45, to aid in gripping a cable (Figs. 3 and 6). The clamp elements are adapted to be attached to the medial portion on a body member to define a channel generally on the arc of the troughs. As here shown, the multiple keyed projection 44 is inserted through the slot 29 in the body member by skewing the clamp element; righting the clamped element then prevents withdrawal of the projection. The slotted ear 42, on the other hand, is held by the clamp screw 36 threaded into the tapped hole 35 of the body member. The screw 36 is tightened until the cable is firmly grasped between the body member and the clamp element (Fig. 3). Large adjustments for different cable diameters are effected by engagement of different keys on the projection 44 with the sides of the key slot 29, while smaller adjustments and final tightening are effected by means of the clamping screw.

With more particular reference to Fig. 4, the two body members may be secured in back-to-back relation by means of the fastening screws 40 inserted through the untapped opening 39 of each body member and into threaded engagement with the tapped fastening opening 38. It is to be particularly noted that notwithstanding the necessary extension of the projections 44 and the clamp screws 36 through the relatively thin body members, the two body members may nevertheless be easily secured in back-to-back relation. That is, the rectangular hole 30 in the first body member registers with the key slot 29 in the second body member and vice versa. Similarly, the circular hole 34 in the first body member registers with the smaller tapped hole 35 in the second body member and vice versa. Thus, the clamp projection 44 engaged in each of the key slots 29 may extend on through the registering rectangular hole 30 and, similarly, the clamp screw 36 threaded into each of the tapped holes 35 may extend on through the registering larger hole 34 (see Fig. 3).

In the use of the dual cable clamp described herein, it is but a simple matter to loosen the clamping screws 36 and insert cables or cable portions into the troughs and under the clamping elements 21 and 22 where they may be locked for support by again tightening the clamping screws 36. The dual support clamp may therefore carry two sections of a cable loop with a smooth arcuate bend as shown particularly in Fig. 1. With such an adjustment loop, the electrical machine 12 to which the cable leads may be moved around considerably without entailing the necessity of cutting or splicing the cable. In addition, the dual support clamp described may be employed to carry or hold a pair of cables where two such cables are run from adjacent points on a bus or supply connection to closely adjacent electrical machines.

The nature of the body members 19, 20 and clamping elements 21, 22, however, is such that they may be used individually as single support clamps. Referring to Fig. 6, it will be seen that the single body member 19 and clamping element 21 there shown in section may serve adequately to support a single cable where the machine is located at a point leaving no slack for an adjustment loop in the cable. Thus, complete versatility of the parts involved in the dual cable clamp is obtained. By having several of the body members and clamping elements described, a shop operator can readily have at his disposal as many dual clamps or single clamps as he might need. It is only necessary to fasten two of the body members in back-to-back relation by using the two fastening screws in order to form a dual clamp from a pair of single clamps.

From the foregoing description it will now be apparent that the dual support clamp of the present invention particularly satisfies the requirements of a clamp for supporting a cable in looped configuration for slack adjustment, or alternatively, a pair of substantially parallel cables. However, the simple and easily formed components of the dual clamp may, if desired, be used separately as individual clamps so that complete versatility for single cable supporting or dual cable supporting requirements is achieved with a small number of identical parts.

I claim:

1. A cable support for two substantially parallel portions of curved cable comprising a pair of flat body members each having two ears bent outwardly from one side thereof to form spaced troughs transversely concave to receive a cable and oriented with their lengthwise dimensions generally along an arc, means for securing said body members in back-to-back relation, a pair of arcuate clamp elements each removably engaged with one of said body members intermediate said troughs to define a channel, said channel lying generally on said arc, and a pair of fastening means projecting through each of said body members to hold respective ones of said clamp elements and thereby adjustably secure curved cable portions laid in said troughs, each of said body members having a first pair of openings spaced on opposite sides of said arc and in which the corresponding fastening means engage and project therethrough, and each of said body members having a second pair of openings located to register with the first openings in the other body member, whereby the fastening means associated with each of said body members may extend through the second openings in the other body member.

2. A cable support comprising a flat sheet metal body member having ears at either end bent outwardly to define troughs spaced generally along an arc, a key slot defined in said body member between said troughs and above said arc, a tapped opening defined in said body member below said arc and laterally spaced from said slot, an arcuate clamp element having a key on one side adapted to extend into and engage the sides of said slot and an ear located on the opposite side to overlie said tapped opening, a screw fastener cooperating with said tapped opening to adjustably and removably secure said ear and clamp element to said body member, said clamp element and body portion defining a channel adjustable in cross section and located along said arc to receive and secure a curved length of cable laid in said troughs, and additional openings defined in said body member located to register with the slot and tapped opening of a second identical body member secured back-to-back against said body member said additional openings thereby accommodating entry of a clamp key and screw fastener carried by such second body member.

3. A cable support for two parallel sections of curved cable comprising first and second identical sheet metal body members each having a central portion and having end portions including ears bent in the same direction to define spaced troughs lying generally on an arc, means securing said body members in back-to-back relation with the ears thereof extending in opposite directions, a narrow key slot and a larger hole defined in each central portion above said arc, the slot in said first body member registering with the hole in said second body member and vice versa, a tapped opening and a larger opening defined in each central portion below said arc and respectively beneath said hole and slot therein, the tapped opening in said first body member registering with the larger opening in said second body member and vice versa, two arcuate clamp elements each having a key on one side for engagement with the key slot in one body portion and a slotted ear on the other side overlying the tapped opening of that body portion, and screw fastener means for engaging each tapped opening and the slotted ear overlying it to removably secure said clamps to said body portions, said clamps forming closed channels of adjustable cross section disposed generally along the arcs of said troughs to receive and secure sections of curved cable laid in said troughs, the key and screw means engaged in the key slot and tapped opening, respectively, of each body member extending freely through the hole and larger opening, respectively, in the second body member.

References Cited in the file of this patent

UNITED STATES PATENTS

| | | |
|---|---|---|
| 1,271,264 | Barnard | July 2, 1918 |
| 2,071,823 | Duncan | Feb. 23, 1937 |
| 2,610,816 | Vote | Sept. 16, 1952 |

FOREIGN PATENTS

| | | |
|---|---|---|
| 501,870 | Germany | of 1930 |
| 757,171 | France | of 1933 |